US008645854B2

(12) United States Patent
Kopycinski et al.

(10) Patent No.: US 8,645,854 B2
(45) Date of Patent: Feb. 4, 2014

(54) PROVISIONING WORKFLOW MANAGEMENT METHODS AND SYSTEMS

(75) Inventors: Michael C. Kopycinski, Monument, CO (US); Charlie H. Helmlinger, Baltimore, MD (US); Todd Kercher, Highlands Ranch, CO (US); Michael B. Friedman, Ashburn, VA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 582 days.

(21) Appl. No.: 12/689,379

(22) Filed: Jan. 19, 2010

(65) Prior Publication Data
US 2011/0179371 A1    Jul. 21, 2011

(51) Int. Cl.
G06F 3/048 (2013.01)
G06F 3/00 (2006.01)

(52) U.S. Cl.
USPC ........... 715/772; 715/751; 715/759; 715/764; 715/771; 709/223; 709/224; 709/225; 709/226

(58) Field of Classification Search
USPC .................. 715/751, 759, 764, 771–772; 709/223–226
See application file for complete search history.

(56) References Cited

U.S. PATENT DOCUMENTS

| | | | | |
|---|---|---|---|---|
| 5,559,955 A * | 9/1996 | Dev et al. | ...................... | 714/4.12 |
| 5,737,727 A * | 4/1998 | Lehmann et al. | ............ | 705/7.13 |
| 5,751,965 A * | 5/1998 | Mayo et al. | .................... | 709/224 |
| 5,799,297 A * | 8/1998 | Goodridge et al. | ................... | 1/1 |
| 5,801,707 A * | 9/1998 | Rolnik et al. | ................. | 715/853 |
| 5,831,610 A * | 11/1998 | Tonelli et al. | ................. | 715/735 |
| 5,870,545 A * | 2/1999 | Davis et al. | .................... | 709/201 |
| 5,937,388 A * | 8/1999 | Davis et al. | .................... | 705/7.26 |
| 6,038,538 A * | 3/2000 | Agrawal et al. | ............. | 705/7.11 |
| 6,154,212 A * | 11/2000 | Eick et al. | ...................... | 715/848 |
| 6,225,999 B1 * | 5/2001 | Jain et al. | ...................... | 715/734 |
| 6,286,137 B1 * | 9/2001 | Bleizeffer et al. | ............ | 717/127 |
| 6,289,380 B1 * | 9/2001 | Battat et al. | ................... | 709/224 |
| 6,445,774 B1 * | 9/2002 | Kidder et al. | ................ | 379/9.03 |
| 6,522,629 B1 * | 2/2003 | Anderson, Sr. | ............... | 370/236 |
| 6,577,327 B1 * | 6/2003 | Rochford et al. | ............ | 715/735 |
| 6,697,784 B2 * | 2/2004 | Bacon et al. | ................. | 705/7.26 |
| 6,704,030 B1 * | 3/2004 | McDonald et al. | ........... | 715/736 |
| 6,714,217 B2 * | 3/2004 | Huang et al. | .................. | 715/736 |
| 6,720,967 B1 * | 4/2004 | Cox et al. | ...................... | 345/440 |
| 6,788,987 B2 * | 9/2004 | Slechta et al. | ................. | 700/106 |
| 6,789,090 B1 * | 9/2004 | Miyake et al. | ................ | 709/223 |
| 6,903,755 B1 * | 6/2005 | Pugaczewski et al. | ........ | 715/735 |
| 6,928,625 B2 * | 8/2005 | Makinen | ........................ | 715/822 |
| 6,957,263 B2 * | 10/2005 | Galou et al. | .................. | 709/227 |
| 6,985,955 B2 * | 1/2006 | Gullotta et al. | ............... | 709/229 |
| 7,120,874 B2 * | 10/2006 | Shah et al. | ..................... | 715/733 |
| 7,124,368 B1 * | 10/2006 | Subramanian et al. | ........ | 715/736 |
| 7,143,100 B2 * | 11/2006 | Carlson et al. | ......................... | 1/1 |

(Continued)

Primary Examiner — Steven B Theriault

(57) ABSTRACT

An exemplary method includes associating one or more workflow tasks with each of a plurality of universal workflow steps, the one or more workflow tasks being specific to a provisioning workflow that corresponds to a first type of network circuit, receiving a request to provision a network circuit of the first type, displaying, in response to the request, graphical depictions of the universal workflow steps in a graphical user interface, determining a completion status of each of the universal workflow steps based on a completion status of each of the one or more workflow tasks associated with each of the universal workflow steps, and graphically indicating in the graphical user interface the completion status of each of the universal workflow steps. Corresponding methods and systems are also disclosed.

20 Claims, 11 Drawing Sheets

(56) References Cited

U.S. PATENT DOCUMENTS

| | | | |
|---|---|---|---|
| 7,185,075 B1* | 2/2007 | Mishra et al. | 709/223 |
| 7,272,616 B1* | 9/2007 | McKinnon | 1/1 |
| 7,280,529 B1* | 10/2007 | Black et al. | 370/352 |
| 7,305,623 B2* | 12/2007 | Despotidis et al. | 715/736 |
| 7,366,989 B2* | 4/2008 | Naik et al. | 715/736 |
| 7,450,505 B2* | 11/2008 | Buchanan et al. | 370/231 |
| 7,469,282 B2* | 12/2008 | Taylor et al. | 709/223 |
| 7,661,061 B2* | 2/2010 | Joshi | 715/205 |
| 7,685,266 B2* | 3/2010 | Mouli et al. | 709/223 |
| 7,689,447 B1* | 3/2010 | Aboujaoude et al. | 705/7.15 |
| 7,711,984 B2* | 5/2010 | Tenenti | 714/15 |
| 7,725,605 B2* | 5/2010 | Palmeri et al. | 709/246 |
| 7,747,954 B2* | 6/2010 | Farid et al. | 715/736 |
| 7,853,467 B2* | 12/2010 | Aboujaoude et al. | 705/7.11 |
| 7,873,918 B2* | 1/2011 | Kawabuchi et al. | 715/837 |
| 7,925,985 B2* | 4/2011 | Moore | 715/772 |
| 7,941,514 B2* | 5/2011 | Wall et al. | 709/223 |
| 7,987,228 B2* | 7/2011 | McKeown et al. | 709/202 |
| 8,014,283 B2* | 9/2011 | Gibson et al. | 370/231 |
| 8,151,208 B2* | 4/2012 | Sogge et al. | 715/772 |
| 8,166,413 B2* | 4/2012 | Arndt et al. | 715/772 |
| 8,191,005 B2* | 5/2012 | Baier et al. | 715/771 |
| 8,321,806 B2* | 11/2012 | Agrusa et al. | 715/772 |
| 2002/0055849 A1* | 5/2002 | Georgakopoulos et al. | 705/1 |
| 2002/0169876 A1* | 11/2002 | Curie et al. | 709/226 |
| 2002/0178252 A1* | 11/2002 | Balabhadrapatruni et al. | 709/223 |
| 2002/0186664 A1* | 12/2002 | Gibson et al. | 370/254 |
| 2002/0191541 A1* | 12/2002 | Buchanan et al. | 370/230 |
| 2003/0012168 A1* | 1/2003 | Elson et al. | 370/338 |
| 2003/0071840 A1* | 4/2003 | Huang et al. | 345/736 |
| 2003/0071844 A1* | 4/2003 | Evans | 345/763 |
| 2003/0097422 A1* | 5/2003 | Richards et al. | 709/217 |
| 2004/0186905 A1* | 9/2004 | Young et al. | 709/225 |
| 2004/0261116 A1* | 12/2004 | Mckeown et al. | 725/109 |
| 2004/0268258 A1* | 12/2004 | Lee et al. | 715/708 |
| 2005/0021766 A1* | 1/2005 | McKeowen et al. | 709/228 |
| 2005/0050196 A1* | 3/2005 | Aita et al. | 709/224 |
| 2005/0131750 A1* | 6/2005 | Kogan et al. | 705/9 |
| 2005/0154741 A1* | 7/2005 | Hebert et al. | 707/100 |
| 2005/0260996 A1* | 11/2005 | Groenendaal | 455/445 |
| 2006/0069596 A1* | 3/2006 | Hatoun et al. | 705/7 |
| 2006/0265583 A1* | 11/2006 | Eilam et al. | 713/100 |
| 2007/0038496 A1* | 2/2007 | Parvatikar et al. | 705/8 |
| 2007/0083588 A1* | 4/2007 | Keller et al. | 709/202 |
| 2007/0168861 A1* | 7/2007 | Bell et al. | 715/701 |
| 2007/0208840 A1* | 9/2007 | McConville et al. | 709/223 |
| 2007/0209058 A1* | 9/2007 | Anantharamiah et al. | 726/1 |
| 2007/0239418 A1* | 10/2007 | Harrison et al. | 703/13 |
| 2007/0245013 A1* | 10/2007 | Saraswathy et al. | 709/223 |
| 2007/0260499 A1* | 11/2007 | Greef et al. | 705/8 |
| 2007/0274074 A1* | 11/2007 | Smires et al. | 362/253 |
| 2008/0155423 A1* | 6/2008 | Moran et al. | 715/736 |
| 2008/0229228 A1* | 9/2008 | Cohen | 715/772 |
| 2008/0235506 A1* | 9/2008 | Eilam et al. | 713/100 |
| 2008/0243902 A1* | 10/2008 | Rong et al. | 707/102 |
| 2008/0244579 A1* | 10/2008 | Muller | 718/100 |
| 2008/0263470 A1* | 10/2008 | Murman et al. | 715/772 |
| 2008/0270597 A1* | 10/2008 | Tenenti | 709/224 |
| 2009/0070121 A1* | 3/2009 | Leonelli et al. | 705/1 |
| 2009/0070162 A1* | 3/2009 | Leonelli et al. | 705/7 |
| 2009/0141706 A1* | 6/2009 | Christie et al. | 370/352 |
| 2009/0157457 A1* | 6/2009 | Huuhtanen et al. | 705/7 |
| 2009/0235194 A1* | 9/2009 | Arndt et al. | 715/772 |
| 2009/0252063 A1* | 10/2009 | Owen et al. | 370/255 |
| 2009/0260071 A1* | 10/2009 | Sadovsky et al. | 726/9 |
| 2009/0293074 A1* | 11/2009 | Rohwer | 719/328 |
| 2010/0049542 A1* | 2/2010 | Benjamin et al. | 705/2 |
| 2010/0100767 A1* | 4/2010 | Liu et al. | 714/28 |
| 2010/0106551 A1* | 4/2010 | Koskimies et al. | 705/9 |
| 2010/0131289 A1* | 5/2010 | Brandt et al. | 705/2 |
| 2010/0167696 A1* | 7/2010 | Smith et al. | 455/411 |
| 2010/0169467 A1* | 7/2010 | Shukla et al. | 709/220 |
| 2010/0218041 A1* | 8/2010 | Tenenti | 714/15 |
| 2010/0293269 A1* | 11/2010 | Wilson et al. | 709/224 |
| 2010/0293544 A1* | 11/2010 | Wilson et al. | 718/1 |
| 2010/0313200 A1* | 12/2010 | Rozee et al. | 718/1 |
| 2010/0324948 A1* | 12/2010 | Kumar et al. | 705/7 |
| 2011/0103566 A1* | 5/2011 | Sarkar et al. | 379/201.12 |
| 2012/0079408 A1* | 3/2012 | Rohwer | 715/772 |
| 2012/0079567 A1* | 3/2012 | Van De Groenendaal | 726/4 |

* cited by examiner

Step 1 – Order Collection Tasks

Status Indicators: ✓ Completed ● Not Ready ✗ Canceled

| Completion Status | Task | Start Date | End Date |
|---|---|---|---|
| ✓ —608 | Order Injection | 12/10/09 05:54:50 PM | 12/10/09 05:59:24 PM |
| ● —610 | Expand Order Data | 12/10/09 06:12:23 PM | 12/10/09 07:14:21 PM |
| | Apply Edits —604 | | |
| ✓ | Derive WF Elements | | |
| | Assign Order Owner | | |
| ● | Status BOD Collection | | |
| | Related Order Check | | |
| ✗ —612 | Check Ethernet Access Firm | | |

OK  Cancel

Fig. 6

Provisioning Workflow Progress

Status Indicators: ✓ Fully Complete　／ Partially Complete　✗ Incomplete

| Completion Status | | Universal Workflow Step | Task | End Date |
|---|---|---|---|---|
| ✓ | + | Order Collection | 802-1 | 12/10/09 05:54:50 PM |
| ✓ | + | Circuit Path Determination | 802-2 | 12/10/09 06:12:23 PM |
| ✓ | + | Order Approval | 802-3 | |
| ✓ | + | Circuit Inventory | 802-4 | |
| ✓ | + | Circuit Engineering | 802-5 | |
| ／ | + | Third Party Ordering | 802-6 | |
| ✓ | + | Layer 1 Provisioning | 802-7 | |
| ／ | + | Customer Premise Equipment | 802-8 | |
| | + | Logical Provisioning | 802-9 | |
| | + | Test and Activation | 802-10 | |
| | + | Order Completion | 802-11 | |

Fig. 8

PROVISIONING WORKFLOW MANAGEMENT METHODS AND SYSTEMS

BACKGROUND INFORMATION

Network providers often have to provision (e.g., establish, initiate, equip, and/or otherwise prepare) network circuits in order to provide network-based services to new customers. Multiple provisioning workflow tasks must be completed in order to provision each network circuit. Ensuring that each of these tasks is completed in an appropriate order is often a difficult challenge for the network providers.

The challenge is exasperated when a network provider offers different types of network-based services, each requiring a different type of network circuit to be provisioned. This is because each type of network circuit may have a distinct set of provisioning workflow tasks associated therewith. A network provider must therefore maintain distinct provisioning workflow management processes, which makes it difficult for provider personnel to manage each of the provisioning workflows and/or integrate new services into existing provisioning workflow management systems.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

FIGS. 5-9 illustrate various graphical user interfaces ("GUIs") that may be displayed according to principles described herein.

DETAILED DESCRIPTION OF PREFERRED EMBODIMENTS

Figure 1:
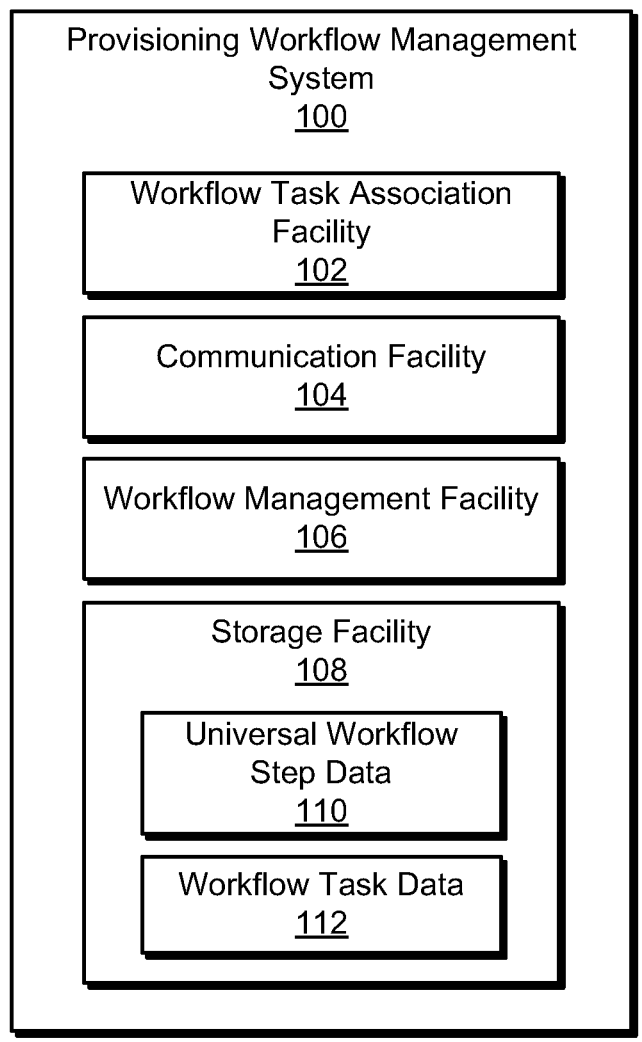
FIG. 1 illustrates an exemplary provisioning workflow management system according to principles described herein.

Exemplary provisioning workflow management methods and systems for a network circuit are described herein. In some examples, one or more workflow tasks specific to a provisioning workflow for the network circuit may be associated with each of a plurality of universal workflow steps. In response to a request to provision the network circuit, graphical depictions of the universal workflow steps may be displayed in a graphical user interface. A completion status of each of the universal workflow steps may be determined based on a completion status of each of the one or more workflow tasks associated with each of the universal workflow steps. The completion status of each of the universal workflow steps may then be graphically indicated in the graphical user interface.

As used herein, a "network circuit" may refer to any network-based communication path and associated components that may be provided by, used by, and/or otherwise associated with a network provider and/or customer of the network provider. For example, a network circuit may include a telecommunication circuit, a dedicated circuit, a switched circuit, an analog circuit, a digital circuit, a network path for a local area network, a digital signal ("DS") circuit (e.g., a T1, T2, or T3 line), and/or any other network-based communication path and associated components as may serve a particular implementation.

In some examples, as will be described in more detail below, a network circuit may be associated with (e.g., used by) a service or product offered by the network provider and/or any other entity. Exemplary services and/or products that use a network circuit include, but are not limited to, private internet protocol ("PIP") services and products, switched circuit services and products, Internet-based services and products, telecommunication-based services and products, and synchronous optical networking ("SONET")-based services and products.

As used herein, a "workflow task" refers to a particular procedure, job, or task that is followed or completed to provision (e.g., install, disconnect, establish, initiate, repair, and/or otherwise modify) a network circuit. Provisioning of a particular network circuit typically requires multiple workflow tasks, many of which are specific to the particular network circuit. Hence, as will be described in more detail below, each workflow task specific to a particular network circuit may be associated with one of a plurality of "universal workflow steps." Each universal workflow step represents a general or universal category of workflow tasks that may be applicable to any type of network circuit that is to be provisioned.

Hence, the methods and systems described herein facilitate management of provisioning workflows for a variety of different types of network circuits using a single set of universal workflow steps. In this manner, a user may readily manage multiple provisioning workflows each associated with a different type of network circuit without having to switch between different workflow management systems, each with its own complexities and nuances. Moreover, the methods and systems described herein facilitate relatively easy integration of new services and products into a provisioning workflow management system described herein because the same set of universal workflow steps are used to manage provisioning workflows of each of the network circuits associated with the new services and products.

The methods and systems described herein further provide enhanced provisioning workflow management capabilities for users thereof. For example, actual performance of workflow tasks associated with a provisioning of a network circuit may be separated from the provisioning workflow management systems described herein, thus creating a more efficient and streamlined workflow management experience for users of the provisioning workflow management systems described herein. Furthermore, the methods and systems described herein may facilitate real-time monitoring of overall progress made in a provisioning workflow associated with a particular network circuit.

FIG. 1 illustrates an exemplary provisioning workflow management system 100 (or simply "system 100"). As will be described in more detail below, system 100 may be configured to manage provisioning workflows for a variety of different types of network circuits. System 100 may include, but is not limited to, a workflow task association facility 102 (or simply "association facility 102"), a communication facility 104, a workflow management facility 106, and a storage facility 108, which may be in communication with one another using any suitable communication technologies. It will be recognized that although facilities 102-108 are shown to be separate facilities in FIG. 1, any of those facilities may be combined into a single facility as may serve a particular implementation. Facilities 102-108 will now be described in more detail.

Association facility 102 may be configured to associate one or more workflow tasks with each of a plurality of universal workflow steps. The workflow tasks may be specific to a provisioning workflow that corresponds to a particular type of network circuit. In other words, the workflow tasks are included in a provisioning workflow that is followed to provision the particular network circuit.

Association facility 102 may be further configured to associate workflow tasks specific to other types of network circuits to each of the universal workflow steps. In this manner, as will be described in more detail below, system 100 may be used to manage provisioning workflows for a variety of different types of network circuits.

Association facility 102 may associate the workflow tasks with the universal workflow steps in any suitable manner. For example, association facility 102 may link data representative of one or more workflow tasks to data representative of a particular universal workflow step maintained by storage facility 108 (e.g., e.g., in the form of a database). Association facility 102 may additionally or alternatively be configured to generate one or more association tables defining association relationships between the workflow tasks and the universal workflow steps. Other association heuristics may be used by association facility 102 to associate workflow tasks with universal workflow steps as may serve a particular implementation.

In some examples, association facility 102 may associate workflow tasks with universal workflow steps in response to user input (e.g., specify that one or more workflow tasks are included within a particular universal workflow step). For example, one or more graphical user interfaces may be provided for display that are configured to receive user input representative of a request to associate one or more workflow tasks with a particular universal workflow step.

Communication facility 104 may be configured to facilitate communication between system 100 and one or more computing devices (e.g., end-user devices, servers, etc.). In some examples, communication facility 104 may be configured to facilitate communication between system 100 and one or more provisioning systems configured to perform one or more of the workflow tasks managed by system 100.

Communication facility 104 may be further configured to facilitate communication between one or more components that implement system 100. For example, communication facility 104 may be configured to facilitate communication between one or more user access devices (e.g., personal computers) associated with workflow management personnel and one or more servers, databases, and/or other components that implement at least a portion of system 100.

In some examples, communication facility 104 may be configured to receive data representative of a request to provision a network circuit. The request may be in the form of a request to order a service or product that utilizes or is otherwise associated with the network circuit. For example, communication facility 104 may receive a request that comprises an order for a PIP service that utilizes a dedicated T1 network circuit.

Workflow management facility 106 may be configured to manage a provisioning workflow associated with provisioning one or more network circuits. For example, workflow management facility 106 may display (e.g., direct a user access device to display) graphical depictions of the universal workflow steps in response to a request to provision a network circuit. The graphical depictions may include any graphical object and/or text representative of the universal workflow steps as may serve a particular application. Exemplary graphical depictions of universal workflow steps will be described in more detail below.

Workflow management facility 106 may be further configured to graphically depict progress made in completing the provisioning of the network circuit. For example, as will be described in more detail below, workflow management facility 106 may determine a completion status of each of the universal workflow steps based on a completion status of each of the one or more workflow tasks associated with each of the universal workflow steps and graphically indicate the completion status of each of the universal workflow steps accordingly.

As used herein, a "completion status" of a universal workflow step indicates whether or not the workflow tasks associated with the universal workflow step have been completed. Hence, a universal workflow step may have a completion status of "fully complete" (i.e., all of the workflow tasks associated with the universal workflow step have been completed or canceled), "partially complete" (i.e., some of the workflow tasks associated with the universal workflow step have been completed or canceled), or "incomplete" (i.e., none of the workflow tasks associated with the universal workflow step have been completed or canceled). Likewise, a "completion status" of a workflow task indicates whether or not the workflow task has been completed. Hence, a workflow task may have a completion status of "complete", "canceled", "not ready" (i.e., cannot be completed until another task has been completed), or "incomplete." It will be recognized that these completion statuses are merely illustrative and that a universal workflow step and/or a workflow task may alternatively have any other completion status as may serve a particular implementation.

In some examples, workflow management facility 106 may dynamically modify one or more of the graphical depictions of the universal workflow steps in order to graphically depict progress made in completing the provisioning of the network circuit. Examples of dynamically modifying one or more graphical depictions of universal workflow steps will be given below.

Storage facility 108 may be configured to maintain universal workflow step data 110 representative of a plurality of universal workflow steps and workflow task data 112 representative of one or more workflow tasks associated each of the universal workflow steps. Data 110 and 112 may be maintained in a way that indicates an association of the workflow tasks with the universal workflow steps. It will be recognized that storage facility 108 may maintain additional or alternative data as may serve a particular implementation.

System 100, including association facility 102, communication facility 104, workflow management facility 106, and storage facility 108, may include any computer hardware and/or computer-implemented instructions (e.g., software), or combinations of computer-implemented instructions and hardware, configured to perform one or more of the processes described herein. For example, system 100, including association facility 102, communication facility 104, workflow management facility 106, and storage facility 108, may include computer hardware (e.g., one or more servers and/or other computing devices) configured to perform one or more of the processes described herein. In some examples, each of the facilities 102-108 may be implemented on one physical computing device or may be implemented on more than one physical computing device. Accordingly, system 100 may include any number of computing devices, and may employ any of a number of computer operating systems.

Association facility 102, communication facility 104, workflow management facility 106, and storage facility 108 may communicate using any communication platforms and technologies suitable for transporting data, including known communication technologies, devices, media, and protocols supportive of remote or local data communications. Examples of such communication technologies, devices, media, and protocols include, but are not limited to, data transmission media, communications devices, Java, Extensible Markup Language ("XML"), Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Simple Object Access Protocol ("SOAP"), Session Initiation Protocol ("SIP"), Ethernet, and/or any other suitable communications technologies, devices, media, and protocols.

Figure 2:
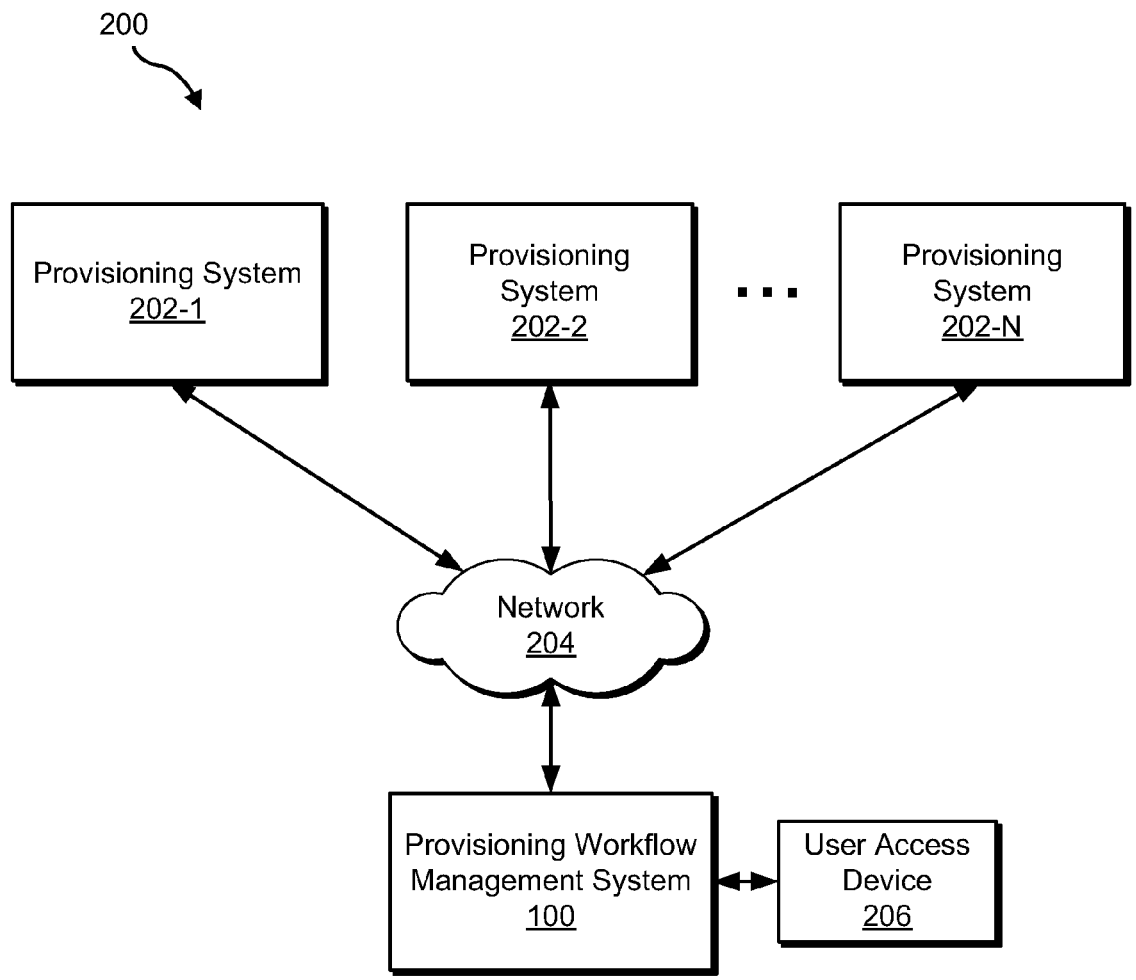
FIG. 2 illustrates an exemplary configuration wherein the provisioning workflow management system of FIG. 1 is communicatively coupled to a plurality of provisioning systems according to principles described herein.

FIG. 2 illustrates an exemplary configuration 200 wherein provisioning workflow management system 100 is communicatively coupled to a plurality of provisioning systems 202 (e.g., provisioning systems 202-1 through 202-N). Each of the provisioning systems 202 may comprise any computer hardware and/or computer-implemented instructions (e.g., software), or combinations of computer-implemented instructions and hardware, configured to implement or perform one or more of the provisioning tasks managed by provisioning workflow management system 100. For example, provisioning systems 202 may include one or more systems configured to perform one or more workflow tasks associated with order collection, circuit path determination, order approval, circuit inventory, circuit engineering, third party ordering, layer one provisioning, customer premises equipment provisioning, logical provisioning, testing and activation, order completion, and/or any other universal workflow task as may serve a particular implementation. Each provisioning system 200 may be distinct and separate from provisioning workflow management system 100. In some examples, provisioning workflow management system 100 may direct one or more of provisioning systems 202 to perform at least one of the workflow tasks described herein.

In certain embodiments, system 100 may communicate with provisioning systems 202 by way of a network 204. Network 204 may include one or more networks or types of networks capable of carrying communications and/or data signals between provisioning workflow management system 100 and provisioning systems 202. For example, network 204 may include, but is not limited to, one or more wireless networks, broadband networks, closed media networks, cable networks, satellite networks, the Internet, intranets, local area networks, public networks, private networks, optical fiber networks, and/or any other networks capable of carrying data and communications signals between provisioning workflow management system 100 and provisioning systems 202. Additionally or alternatively, provisioning workflow management system 100 may communicate directly one or more of provisioning systems 202 with another without the use of network 204.

In some examples, provisioning workflow management system 100 and/or provisioning systems 202 may each include or be in communication with a user access device configured to facilitate user access to and/or control of one or more operations performed by provisioning workflow management system 100 and/or provisioning systems 202. For example, as shown in FIG. 2, provisioning workflow management system 100 may be communicatively coupled to a user access device 206. User access device 206 may be configured to access and display the graphical user interface generated and displayed by provisioning workflow management system 100 so that a user thereof (e.g., a workflow manager and/or another type of user) may manage universal workflow steps and tasks associated with provisioning one or more network circuits. User access device 206 may include any suitable computing device such as, but not limited to, a personal computer, a communications device, a mobile device (e.g., a mobile phone device), a handheld device, and/or any other suitable computing device.

Figure 3:
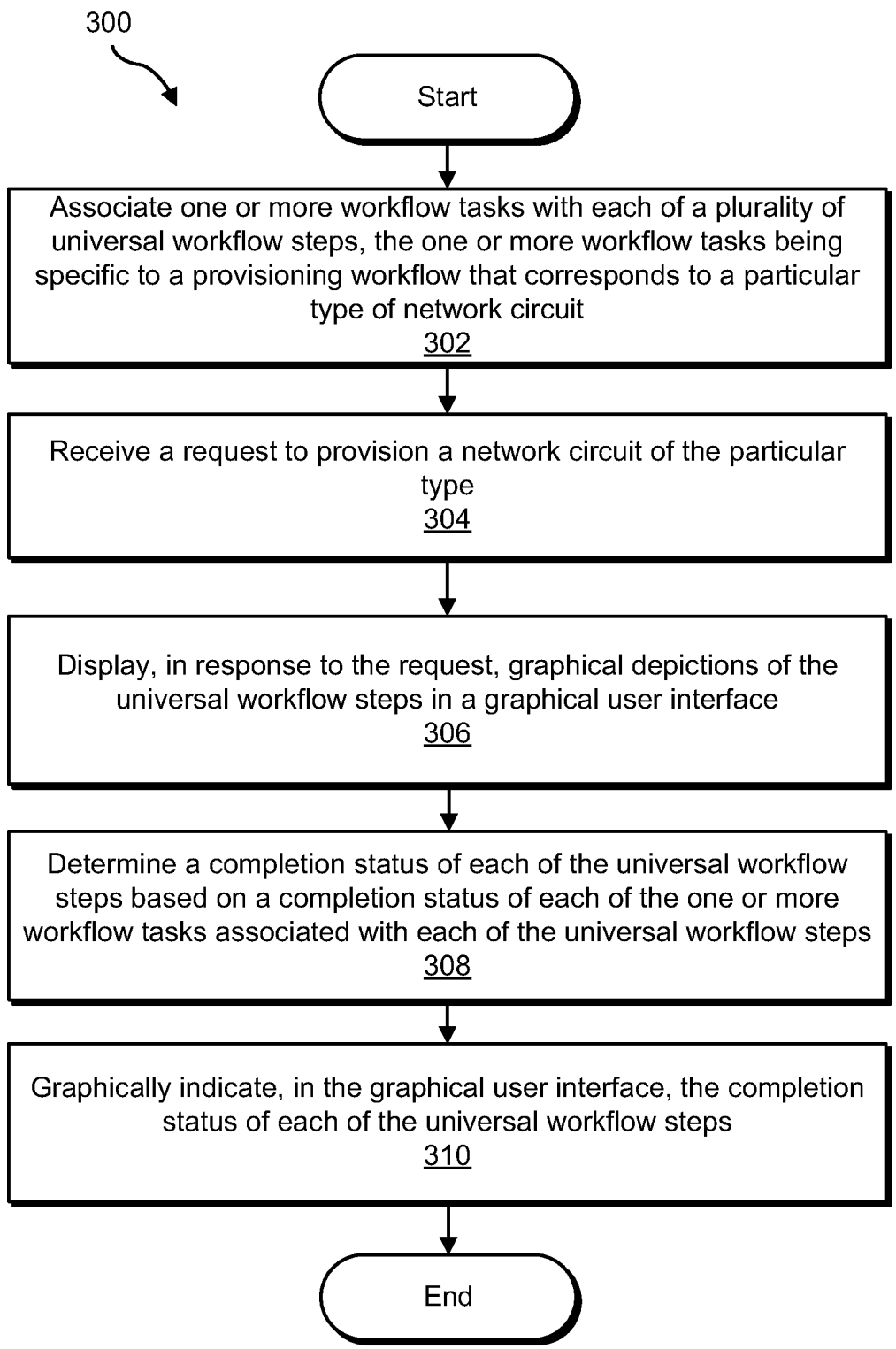
FIG. 3 illustrates an exemplary method of managing a provisioning workflow for a network circuit according to principles described herein.

FIG. 3 illustrates an exemplary method 300 of managing a provisioning workflow for a network circuit. While FIG. 3 illustrates exemplary steps according to one embodiment, other embodiments may omit, add to, reorder, and/or modify any of the steps shown in FIG. 3. The steps shown in FIG. 3 may be performed by any component of provisioning workflow management system 100.

In step 302, one or more workflow tasks are associated with each of a plurality of universal workflow steps. The one or more workflow tasks may be specific to a provisioning workflow that corresponds to a particular type of network circuit. In other words, the one or more workflow tasks may be performed in order to provision the particular type of network circuit. Exemplary universal workflow steps and associated workflow tasks will be described in more detail below. Step 302 may be performed by association facility 102, for example, in any of the ways described herein.

In step 304, a request to provision a network circuit of the particular type is received. The request may be received in any of the ways described herein. For example, communication facility 104 may receive a request for a service or product that utilizes or is otherwise associated with the network circuit.

In step 306, graphical depictions of the universal workflow steps are displayed in a graphical user interface in response to the request received in step 304. The graphical depictions may be displayed by workflow management facility 106 in any of the ways described herein. An exemplary graphical user interface with graphical depictions of universal workflow steps will be described in more detail below.

In step 308, a completion status of each of the universal workflow steps is determined based on a completion status of each of the one or more workflow tasks associated with each of the universal workflow steps. Workflow management facility 106 may determine the completion status of each of the universal workflow steps in any of the ways described herein.

In step 310, the completion status of each of the universal workflow steps is graphically indicated in the graphical user interface. Workflow management facility 106 may graphically indicate the completion statuses in any suitable manner. Exemplary graphical depictions of the completion statuses will be described in more detail below.

Steps 302-310 may be repeated for one or more additional types of network circuits included in the plurality of distinct types of network circuits. In this manner, method 300 may be used to manage provisioning workflows for different types of network circuits.

Exemplary implementations of method 300 will now be given in connection with FIGS. 4-9. The exemplary implementations illustrated in FIGS. 4-9 correspond to an exemplary provisioning workflow that has eleven universal workflow steps. It will be recognized that the exemplary universal workflow steps described herein are merely illustrative of the many different universal workflow steps that may be included in a provisioning workflow for a particular type of network circuit.

Figure 4:
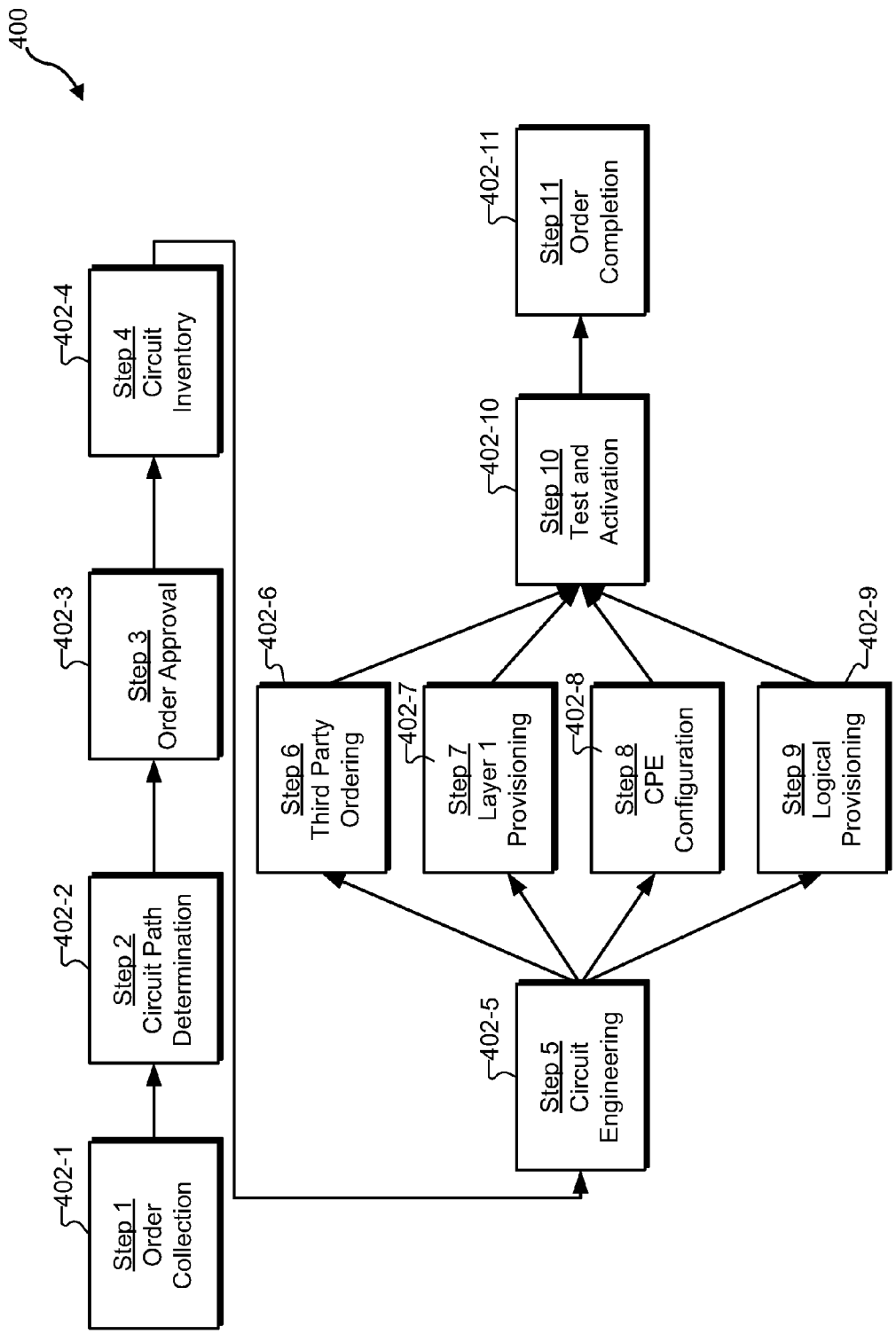
FIG. 4 illustrates an exemplary provisioning workflow that includes a plurality of universal workflow steps according to principles described herein.

FIG. 4 illustrates an exemplary provisioning workflow 400 that includes a plurality of universal workflow steps 402 (e.g., universal workflow steps 402-1 through 402-11). For example, provisioning workflow 400 may include an order collection step 402-1, a circuit path determination step 402-2, an order approval step 402-3, a circuit inventory step 402-4, a circuit engineering step 402-5, a third party ordering step 402-6, a layer one provisioning step 402-7, a customer premises equipment configuration step 402-8, a logical provisioning step 402-9, a test and activation step 402-10, and an order completion step 402-11.

Universal workflow steps 402 illustrated in FIG. 4 are merely illustrative of the many different universal workflow steps that may be included in a provisioning workflow for a network circuit. It will be recognized that one or more of the universal workflow steps 402 illustrated in FIG. 4 may be utilized in order to manage a provisioning workflow associated with establishing a new network circuit, modifying an active network circuit, and/or terminating an active network circuit.

In some examples, one or more workflow tasks may be associated with each of the universal workflow steps 402 shown in FIG. 4. Exemplary workflow tasks that may be associated with each of the universal workflow steps 402 will now be described. It will be recognized that the workflow tasks described herein are merely illustrative of the many different workflow tasks that may be associated with each of universal workflow steps 402.

One or more workflow tasks may be associated with order collection step 402-1 that are configured to facilitate receiving, validating, and/or initiating a request to provision a network circuit. For example, workflow tasks associated with order collection step 402-1 may be configured to facilitate receipt of an order for a service or product associated with a particular network circuit, collection of information about the ordering customer, collection of information about the ordered service or product, collection of information about one or more logistics of provisioning the network circuit that are specific to the particular customer, and/or perform any other procedure associated with collection of an order for a service and/or product.

One or more workflow tasks may be associated with circuit path determination step 402-2 that are configured to facilitate determination of a physical and/or logistic path associated with a requested network circuit. For example, workflow tasks associated with circuit path determination step 402-2 may be configured to facilitate, either internally within the provider's network or by way of calls to third party applications or systems, the building of an end-to-end path that the network circuit will take through one or more networks in order to provide the requested product or service. Workflow tasks associated with circuit path determination step 402-2 may be additionally or alternatively configured to derive one or more engineering parameters needed to perform layer one through three provisioning for the network circuit.

In some examples, circuit path determination step 402-2 may be used to create new circuit path for a new service or product and/or implement one or more changes to an active network circuit that require one or more changes to be made to a network path associated with the active network circuit.

One or more workflow tasks may be associated with order approval step 402-3 that are configured to facilitate approval of the order collected in order collection step 402-1. For example, workflow tasks associated with order approval step 402-3 may be configured to approve information collected in order collection step 402-1, commit to the circuit path determined in circuit path determination step 402-2, and/or approve any changes made to an order after it is initially requested.

One or more workflow tasks may be associated with circuit inventory step 402-4 that are configured to facilitate performance of one or more inventory procedures related to the requested network circuit. For example, workflow tasks associated with circuit inventory step 402-4 may be configured to access, create, and/or update one or more entries in an inventory database in order to ensure availability of equipment and/or resources necessary to provision the network circuit. Workflow tasks associated with circuit inventory step 402-4 may be additionally or alternatively configured to assign the network circuit to one or more high-level parent facilities and/or otherwise associate the network circuit with one or more other entities.

One or more workflow tasks may be associated with circuit engineering step 402-5 that are configured to facilitate derivation of engineering data associated with the provisioning of the network circuit. For example, workflow tasks associated with circuit engineering step 402-5 may be configured to facilitate derivation of order, circuit, and customer drop level engineering data needed by one or more business functions that support one or more subsequent universal workflow steps (e.g., universal workflow steps 402-6 through 402-9). In some examples, circuit engineering step 402-5 may be combined with circuit path determination step 402-2 and/or performed concurrently with circuit path determination step 402-2.

One or more workflow tasks may be associated with third party ordering step 402-6 that are configured to facilitate coordination with one or more third party network entities in order to complete an order for a particular service or product. To illustrate, circuit path determination step 402-2 may determine that a portion of the network path is to pass through a third party network. Hence, workflow tasks associated with third party ordering step 402-6 may be configured to acquire permission to pass through the third party network, coordinate provisioning of the third party network, and/or perform any other action associated with the third party network as may serve a particular implementation.

One or more workflow tasks may be associated with layer one provisioning step 402-7 that are configured to facilitate Open Systems Interconnection ("OSI") layer one provisioning. For example, workflow tasks associated with layer one provisioning step 402-7 may be configured to request and manage creating, changing, and/or dropping of a service from an internal physical OSI layer one network management system for one or more portions of the network circuit that will be carried on the internal network.

One or more workflow tasks may be associated with customer premises equipment configuration step 402-8 that are configured to configure or otherwise manage customer premises equipment associated with the network circuit. For example, workflow tasks associated with customer premises equipment configuration step 402-8 may be configured to manage a progress of ordering, configuring, procuring, shipping, delivering, and/or installing equipment at the customer premises that will be used to support the network circuit being provisioned.

One or more workflow tasks may be associated with logical provisioning step 402-9 that are configured to facilitate provisioning of an internal logical (e.g., OSI layers two and three) network management system. For example, workflow tasks associated with logical provisioning step 402-9 may be configured to manage a progress of creating, changing, or dropping a service from internal logic (e.g., OSI layers two and/or three) for portions of the network circuit that will be carried on an internal network that supports logical routing services and protocols (e.g., TCP/IP, frame relay, Ethernet, etc.).

One or more workflow tasks may be associated with test and activation step 402-10 that are configured to facilitate testing and/or activation of an established network circuit. For example, workflow tasks associated with test and activation step 402-10 may be configured to request and manage a progress of one or more tests performed on the network circuit and/or an activation of the network circuit.

One or more workflow tasks may be associated with order completion step 402-11 that are configured to facilitate completion of an order. For example, workflow tasks associated with order completion step 402-11 may be configured to notify one or more external systems or personnel that the provisioning of network circuit is complete and that no further actions may be taken with regard to provisioning the circuit without the submission of a new order. In some examples, when order completion step 402-11 has been completed, other functions associated with the network circuit may be performed. For example, completion of order completion step 402-11 may trigger a commencement of billing for the service or product associated with the network circuit.

Workflow tasks associated with one or more of universal workflow steps 402 may be performed in parallel. For example, workflow tasks associated with universal workflow steps 402-6 through 402-9 may be performed in parallel, as shown in the example of FIG. 4.

In some examples, one or more of the workflow tasks associated with one or more of the universal workflow steps 402 may be automatically performed (e.g., by one or more provisioning systems 202). Additionally or alternatively, one or more of the workflow tasks associated with one or more of the universal workflow steps 402 may be manually performed by network provider personnel and/or by one or more other users.

In some examples, distinct sets of workflow tasks may be associated with each of the universal workflow steps 402. In this manner, system 100 may be used to manage provisioning workflows associated with distinct types of network circuits.

Once workflow tasks corresponding to a particular type of network circuit have been associated with each of the universal workflow steps 402 shown in FIG. 4, system 100 may be used to mange a provisioning workflow associated with that type of network circuit. As described in steps 304, 306, 308, and 310 of FIG. 3, system 100 may manage a provisioning workflow associated with a network circuit by receiving a request to provision the network circuit, display graphical depictions of the universal workflow steps in a graphical user interface in response to the request, determine a completion status of each of the universal workflow steps based on a completion status of each of the one or more workflow tasks associated with each of the universal workflow steps, and graphically indicate the completion status of each of the universal workflow steps in the graphical user interface.

Figure 5:
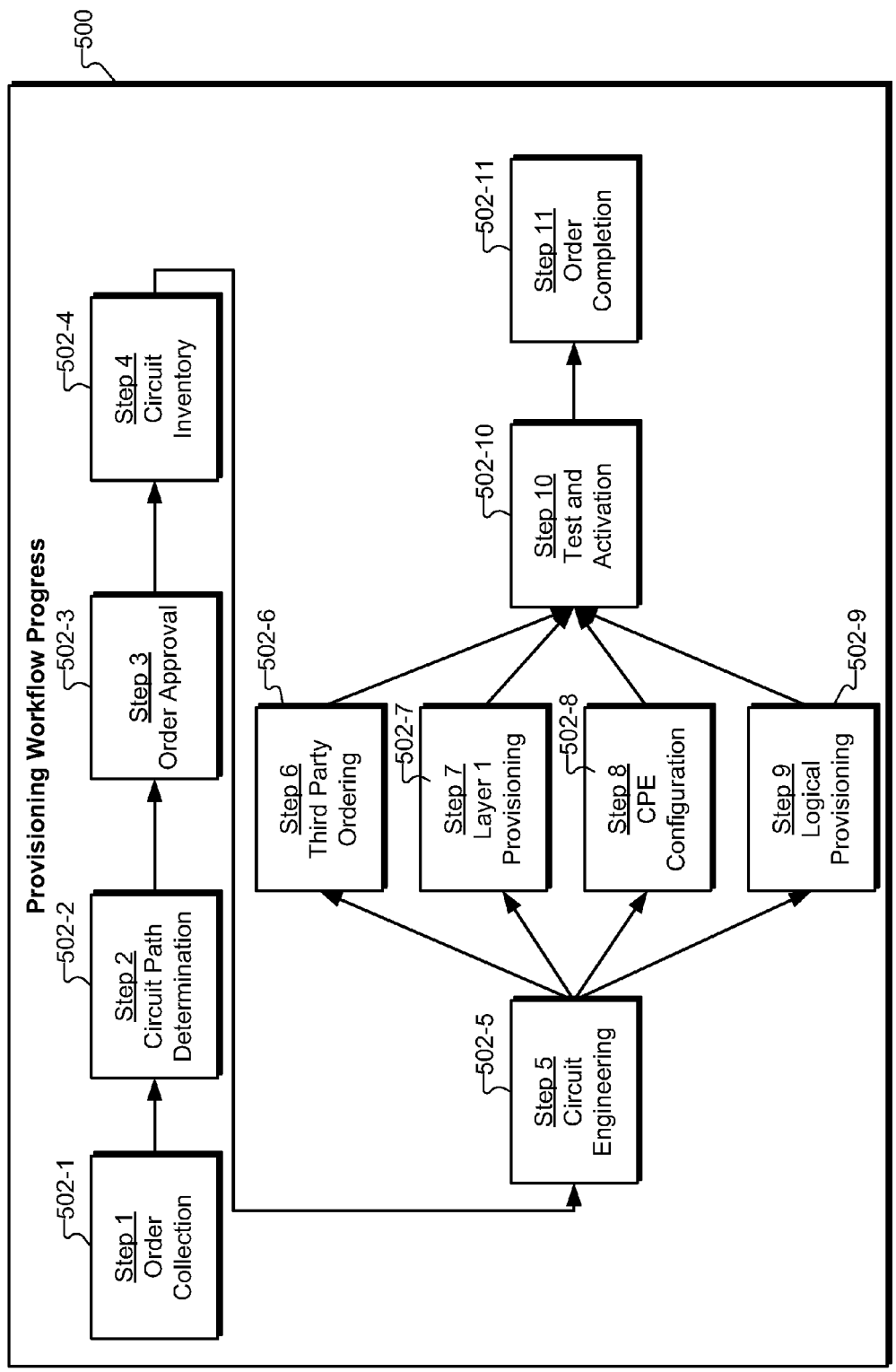

FIG. 5 illustrates an exemplary provisioning workflow progress graphical user interface ("GUI") 500 that may be displayed in response to a request to provision a network circuit. As shown in FIG. 5, GUI 500 includes graphical depictions 502 (e.g., graphical depictions 502-1 through 502-11) of each of the universal workflow steps 402 shown in FIG. 4. Graphical depictions 502 shown in FIG. 5 are merely illustrative of the many different ways in which universal workflow steps may be graphically depicted in a graphical user interface. Alternative graphical depictions of universal workflow steps will be described in more detail below.

In some examples, a graphical depiction 502 representative of a particular universal workflow step may be selected by a user in order to display specific workflow tasks associated with the particular universal workflow step. For example, FIG. 6 illustrates an exemplary GUI 600 that may be displayed in response to a user selection of graphical depiction 502-1 representative of order collection step 402-1. As shown in FIG. 6, GUI 600 may display a table 602 that includes a list of workflow tasks associated with the order collection step 402-1. The workflow tasks shown in FIG. 6 are merely illustrative of the many different workflow tasks that may be associated with order collection step 402-1. Table 602 may also display other information associated with each workflow task, such as, but not limited to, start and end dates associated with each workflow task and a completion status associated with each workflow task.

In some examples, a particular workflow task included in table 602 may be selected in order to access additional information and/or options associated with the workflow task. For example, in response to a user selection of a workflow task labeled "expand order data" 604, another GUI may be displayed that is configured to present information and/or one or more options associated with the "expand order data" task. Exemplary options that may be displayed may include, but are not limited to, options to assign the task to one or more systems, users, and/or other entities, options to edit and/or change a completion status of the task, and/or any other option as may serve a particular implementation.

As shown in FIG. 6, GUI 600 may graphically indicate a completion status of each of the workflow tasks associated with a universal workflow step. For example, column 606 may include graphical depictions of status indicators representing a completion status of each of the workflow tasks listed in table 602. For example, a checkmark (e.g., checkmark 608) may be used to indicate that a particular workflow task has been completed. A filled circle (e.g., filled circle 610) may be used to indicate that a particular workflow task is not ready to be completed (i.e., that one or more other workflow tasks upon which the particular workflow task depends have not been completed). An "x" (e.g., "x" 612) may be used to indicate that a particular workflow task has been canceled for a particular reason. A blank field in the completion status column 604 may indicate that a particular workflow task has not been completed. It will be recognized that the completion statuses may be alternatively represented as may serve a particular implementation.

In some examples, a user may utilize GUI 600 in order to indicate to system 100 that a particular workflow task has been completed, is not ready, or has been canceled. For example, a user may input a command by way of GUI 600 to designate a particular workflow task as being completed, not ready, or canceled. Additionally or alternatively, system 100 may be configured to automatically designate a particular workflow task as being completed, not ready, or canceled.

As mentioned, system 100 may utilize the completion status of each of the workflow tasks to determine a completion status of each of the universal workflow steps 402. For example, system 100 may determine that order collection step 402-1 has a completion status of "partially complete" based on the completion statuses of the workflow tasks listed in GUI 600.

In some examples, the completion status of each of the universal workflow steps 402 may be graphically indicated in graphical user interface 500. In this manner, a viewer of GUI 500 may readily visualize the progress that is being made in completing the provisioning of the network circuit.

Figure 7:
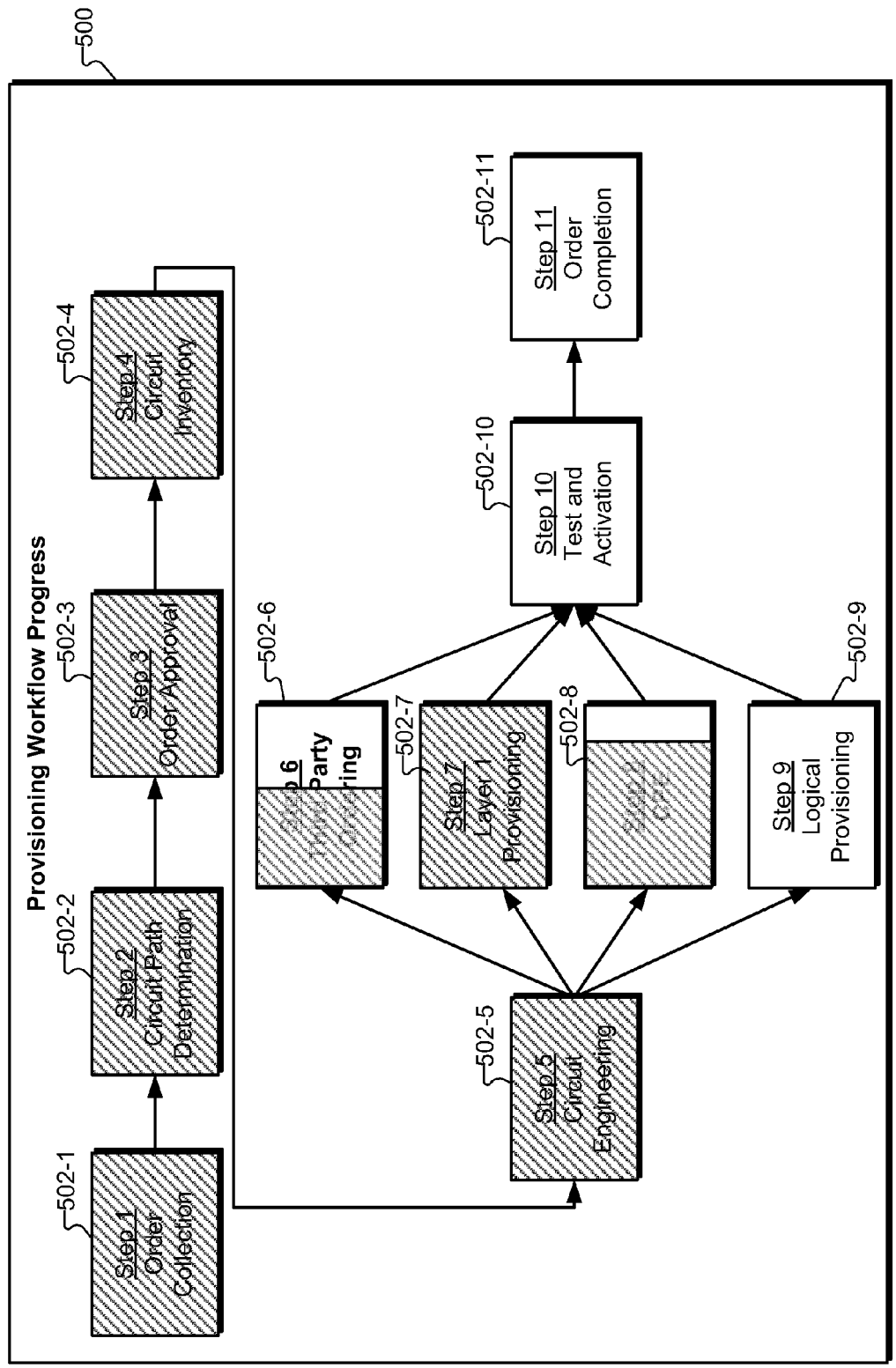

To illustrate, FIG. 7 shows GUI 500 with a completion status of each of the universal workflow steps 402 graphically indicated therein. The completion status of each of the universal workflow steps 402 may be graphically indicated in any suitable manner as may serve a particular implementation. For example, one or more display attributes (e.g., fill color and/or amount, size, etc.) of graphical depictions 502 may be dynamically modified in response to a completion of one or more of the workflow tasks associated with each universal workflow step 402.

For example, as shown in FIG. 7, graphical depictions 502 may be modified (e.g., filled in, as shown in FIG. 7) to graphically indicate a completion status each of the universal workflow steps 402. To illustrate, FIG. 7 shows graphical depictions 502-1 through 502-5 and 502-7 as being completely filled in to graphically indicate that their corresponding universal workflow steps (i.e., universal workflow steps 402-1 through 402-5 and 402-7) have completion statuses of "fully complete." In contrast, graphical depictions 502-9 through 502-11 are not filled in to graphically indicate that their corresponding universal workflow steps (i.e., universal workflow steps 402-9 through 402-11) have completion statuses of "incomplete." Graphical depictions 502-6 and 502-8 are partially filled in to graphically indicate that their corresponding universal workflow steps (i.e., universal workflow steps 402-6 and 402-8) are "partially complete." In some examples, the degree to which a graphical depiction 502 representative of a universal workflow step 402 is filled in may correspond to a percentage of completed workflow tasks associated with the universal workflow step.

In some examples, graphical indications of the completion statuses of the universal workflow steps 402 may be dynamically updated as workflow tasks are completed. In this manner, a user may track the progress made in completing the provisioning workflow represented by the universal workflow steps 402 in real-time.

FIG. 8 illustrates another exemplary provisioning workflow progress graphical user interface ("GUI") 800 that may be displayed in response to a request to provision a network circuit. GUI 800 includes graphical depictions 802 (e.g., graphical depictions 802-1 through 802-11) of each of the universal workflow steps 402 shown in FIG. 4. As shown in FIG. 8, each graphical depiction 802 may include a text box descriptive of its corresponding universal workflow step 402. Each text box may be included in a table 804.

Table 804 may be further configured to include a completion status column 806 in which status indicators may be displayed to graphically represent a completion status of each of the universal workflow steps 402. For example, a checkmark (e.g., checkmark 808) may be displayed adjacent to a text box (e.g., text box 802-1) representative of a universal workflow step that has a completion status of "fully complete." A "\" character (e.g., character 810) may be displayed adjacent to a text box (e.g., text box 802-6) representative of a universal workflow step that has a completion status of "partially complete." A blank field (e.g., blank field 812) may be displayed adjacent to a text box (e.g., text box 802-9) representative of a universal workflow step that has a completion status of "incomplete." Completion statuses of the universal workflow steps 402 may be alternatively indicated in GUI 800 in any suitable manner as may serve a particular implementation.

Figure 9:
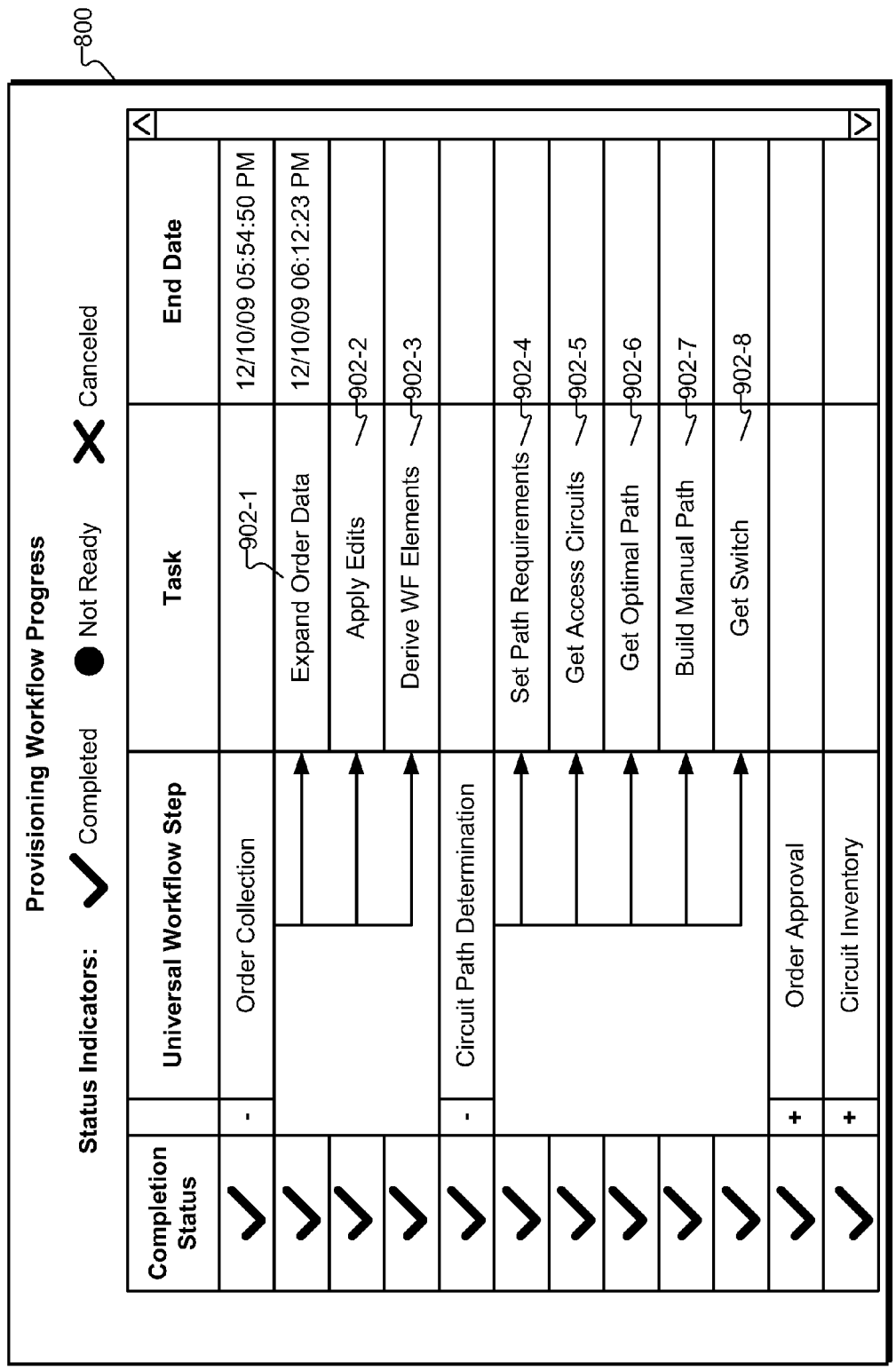

In some examples, a user may select an expansion icon (e.g., expansion icon 814) associated with a particular universal workflow step in order to view or otherwise access workflow tasks associated with the universal workflow step. FIG. 9 shows GUI 800 after a user has input a command to expand order collection step 402-1 and circuit path determination step 402-2. As shown in FIG. 9, graphical representations of workflow tasks 902 (e.g., graphical representations 902-1 through 902-8) may be displayed in GUI 900 in response to the expansion command. In some examples, a user may utilize GUI 900 to designate a completion status of one or more workflow tasks in a similar manner as that described in connection with FIG. 6.

Figure 10:
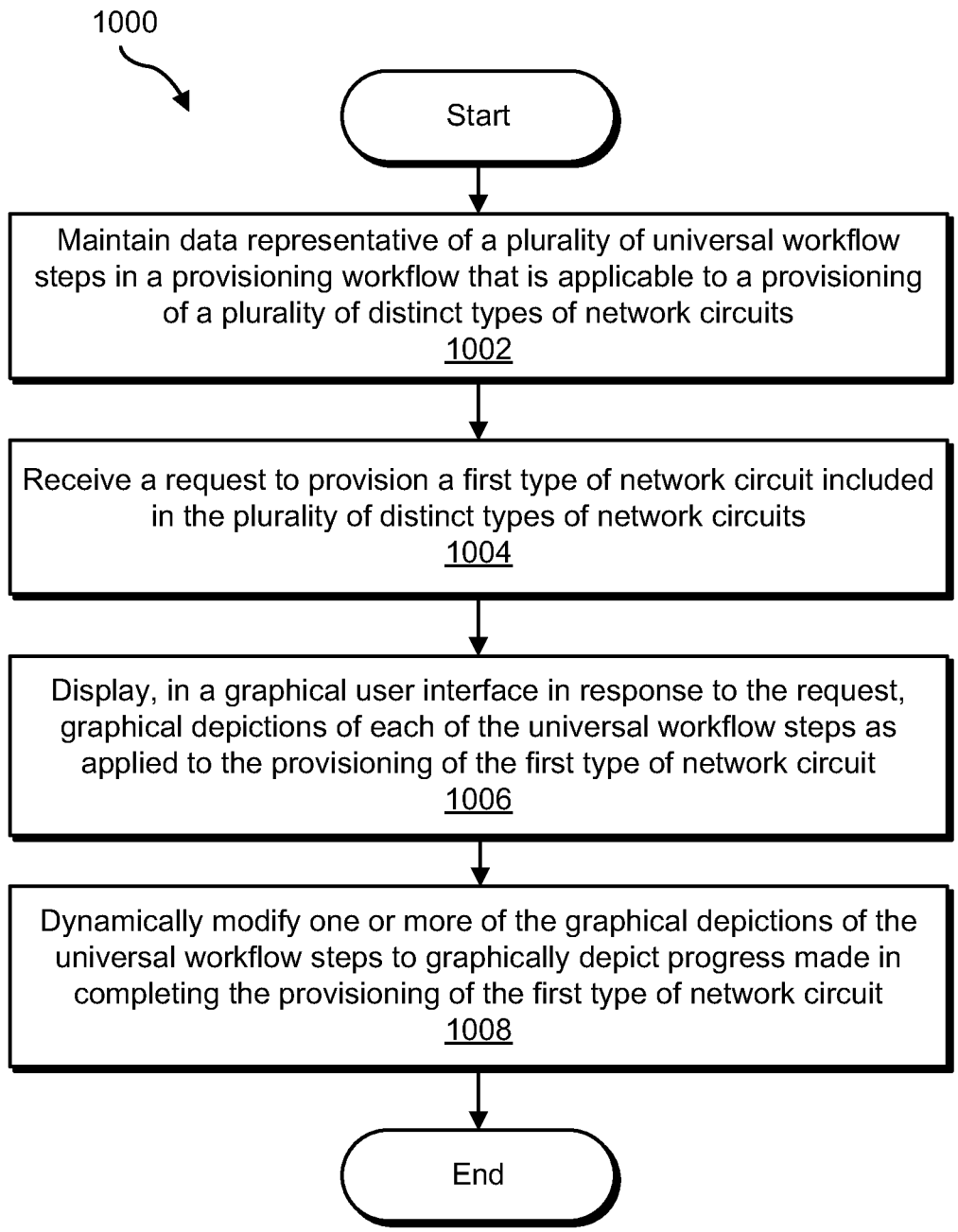
FIG. 10 illustrates another exemplary method of managing a provisioning workflow for a network circuit according to principles described herein.

FIG. 10 illustrates another exemplary method 1000 of managing a provisioning workflow for a network circuit. While FIG. 10 illustrates exemplary steps according to one embodiment, other embodiments may omit, add to, reorder, and/or modify any of the steps shown in FIG. 10. The steps shown in FIG. 10 may be performed by any component of provisioning workflow management system 100.

In step 1002, data representative of a plurality of universal workflow steps in a provisioning workflow that is applicable to a provisioning of a plurality of distinct types of network circuits is maintained. The data may be maintained in storage facility 108 as universal workflow step data 110, for example.

In step 1004, a request is received to provision a first type of network circuit included in the plurality of distinct types of network circuits. The request may be received in any of the ways described herein.

In step 1006, graphical depictions of each of the universal workflow steps as applied to the provisioning of the first type of network circuit are displayed in a graphical user interface in response to the request. The graphical depictions may be displayed in any of the ways described herein.

In step 1008, one or more of the graphical depictions of the universal workflow steps are dynamically modified to graphically depict progress made in completing the provisioning of the first type of network circuit. The graphical depictions may be dynamically modified in any of the ways described herein.

Steps 1004-1008 may be repeated for one or more additional types of network circuits included in the plurality of distinct types of network circuits. In this manner, method 1000 may be used to manage provisioning workflows for different types of network circuits.

In certain embodiments, one or more of the components and/or processes described herein may be implemented and/or performed by one or more appropriately configured computing devices. To this end, one or more of the systems and/or components described above may include or be implemented by any computer hardware and/or computer-implemented instructions (e.g., software), or combinations of computer-implemented instructions and hardware, configured to perform one or more of the processes described herein. In particular, system components may be implemented on one physical computing device or may be implemented on more than one physical computing device. Accordingly, system components may include any number of computing devices, and may employ any of a number of computer operating systems.

In certain embodiments, one or more of the processes described herein may be implemented at least in part as instructions executable by one or more computing devices. In general, a processor (e.g., a microprocessor) receives instructions, from a tangible computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any medium that participates in providing data (e.g., instructions) that may be read by a computer (e.g., by a processor of a computer). Such a medium may take many forms, including, but not limited to, non-volatile media and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a floppy disk, flexible disk, hard disk, magnetic tape, any other magnetic medium, a CD-ROM, DVD, any other optical medium, a RAM, a PROM, an EPROM, a FLASH-EEPROM, any other memory chip or cartridge, or any other tangible medium from which a computer can read.

Figure 11:
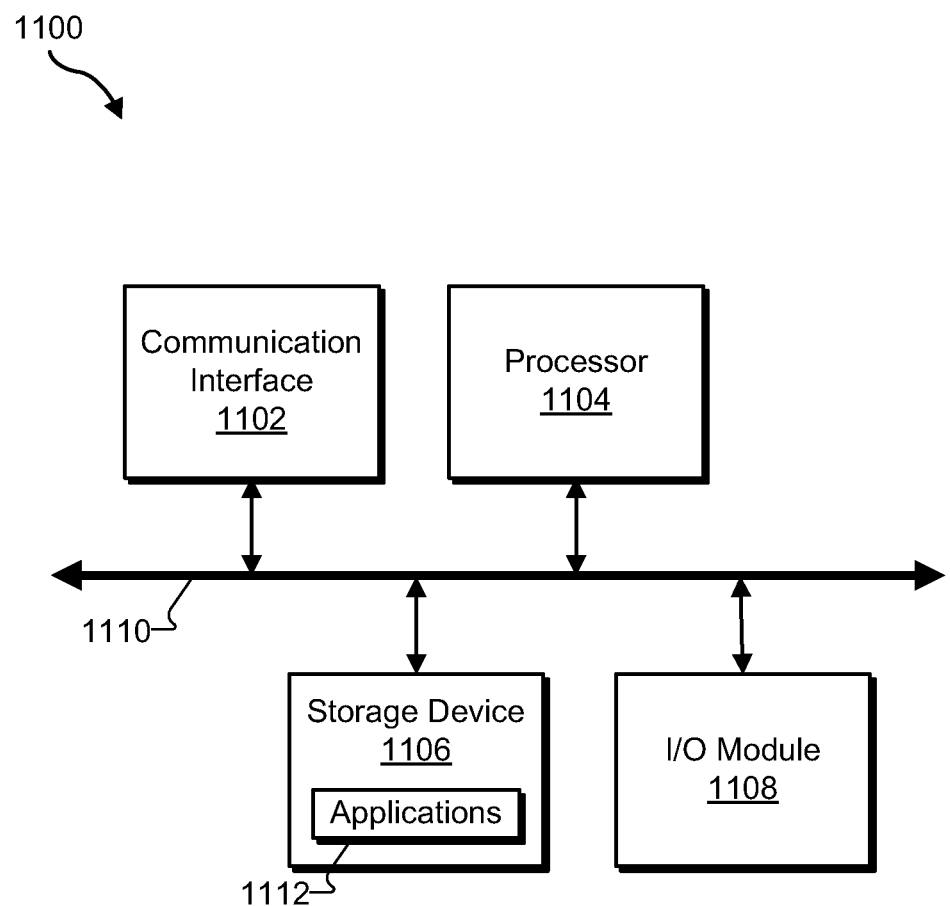
FIG. 11 illustrates an exemplary computing device according to principles described herein.

FIG. 11 illustrates an exemplary computing device 1100 that may be configured to perform one or more of the processes described herein. As shown in FIG. 11, computing device 1100 may include a communication interface 1102, a processor 1104, a storage device 1106, and an input/output ("I/O") module 1108 communicatively connected via a communication infrastructure 1110. While an exemplary computing device 1100 is shown in FIG. 11, the components illustrated in FIG. 11 are not intended to be limiting. Additional or alternative components may be used in other embodiments. Components of computing device 1100 shown in FIG. 11 will now be described in additional detail.

Communication interface 1102 may be configured to communicate with one or more computing devices. Examples of communication interface 1102 include, without limitation, a wired network interface (such as a network interface card), a wireless network interface (such as a wireless network interface card), a modem, and any other suitable interface. In at least one embodiment, communication interface 1102 may provide a direct connection between system 100 and one or more of provisioning systems 202 via a direct link to a network, such as the Internet. Communication interface 1102 may additionally or alternatively provide such a connection through, for example, a local area network (such as an Ethernet network), a personal area network, a telephone or cable network, a satellite data connection, a dedicated URL, or any other suitable connection. Communication interface 1102 may be configured to interface with any suitable communication media, protocols, and formats, including any of those mentioned above.

Processor 1104 generally represents any type or form of processing unit capable of processing data or interpreting, executing, and/or directing execution of one or more of the instructions, processes, and/or operations described herein. Processor 1104 may direct execution of operations in accordance with one or more applications 1112 or other computer-executable instructions such as may be stored in storage device 1106 or another computer-readable medium.

Storage device 1106 may include one or more data storage media, devices, or configurations and may employ any type, form, and combination of data storage media and/or device. For example, storage device 1106 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 1106.

For example, data representative of one or more executable applications 1112 (which may include, but are not limited to, one or more of the software applications described herein) configured to direct processor 1104 to perform any of the operations described herein may be stored within storage device 1106. In some examples, data may be arranged in one or more databases residing within storage device 1106.

I/O module 1108 may be configured to receive user input and provide user output and may include any hardware, firmware, software, or combination thereof supportive of input and output capabilities. For example, I/O module 1108 may include hardware and/or software for capturing user input, including, but not limited to, a keyboard or keypad, a touch screen component (e.g., touch screen display), a receiver (e.g., an RF or infrared receiver), and/or one or more input buttons.

I/O module 1108 may include one or more devices for presenting output to a user, including, but not limited to, a graphics engine, a display (e.g., a display screen, one or more output drivers (e.g., display drivers), one or more audio speakers, and one or more audio drivers. In certain embodiments, I/O module 1108 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 1100. For example, one or more applications 1112 residing within storage device 1106 may be configured to direct processor 1104 to perform one or more processes or functions associated with association facility 102, communication facility 104, and/or workflow management facility 106. Likewise, storage facility 108 may be implemented by or within storage device 1106.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:

associating, by a provisioning workflow management system, one or more workflow tasks with each of a plurality of universal workflow steps, the one or more workflow tasks being specific to a provisioning workflow that corresponds to a first type of network circuit;

receiving, by the provisioning workflow management system, a request to provision a network circuit of the first type;

displaying, by the provisioning workflow management system in response to the request, graphical depictions representative of the universal workflow steps for provisioning the network circuit of the first type in a graphical user interface;

detecting, by the provisioning workflow management subsystem, a selection by a user of a graphical depiction included in the graphical depictions and representative of a universal workflow step included in the plurality of universal workflow steps;

displaying, by the provisioning workflow management subsystem in response to the selection by the user of the graphical depiction representative of the universal workflow step, the one or more workflow tasks associated with the universal workflow step;

updating, by the provisioning workflow management subsystem while the one or more workflow tasks associated with the universal workflow step are displayed, a completion status of at least one workflow task included in the one or more workflow tasks associated with the universal workflow step;

determining, by the provisioning workflow management system, a completion status of one or more universal workflow steps included in the plurality of universal workflow steps based on the updated completion status of the at least one workflow task;

graphically indicating, by the provisioning workflow management system in the graphical user interface, the completion status of the one or more universal workflow steps;

dynamically updating, by the provisioning workflow management system, the graphical indication of the completion status of the one or more universal workflow steps in real time as the one or more workflow tasks associated with the one or more universal workflow steps are determined to be completed.

2. The method of claim 1, further comprising:

associating, by the provisioning workflow management system, one or more other workflow tasks with each of the plurality of universal workflow steps, the one or more other workflow tasks being specific to another provisioning workflow that corresponds to a second type of network circuit;

receiving, by the provisioning workflow management system, another request to provision a network circuit of the second type;

displaying, by the provisioning workflow management system in response to the another request, other graphical depictions of each of the universal workflow steps in the graphical user interface;

determining, by the provisioning workflow management system, a completion status of each of the universal workflow steps associated with the other graphical depictions based on a completion status of each of the one or more other workflow tasks associated with each of the universal workflow steps; and graphically indicating, by the provisioning workflow management system in the graphical user interface, the completion status of each of the universal workflow steps associated with the other graphical depictions.

3. The method of claim 1, wherein the network circuit corresponds to a service or product ordered by a customer by way of an order, and wherein the plurality of universal workflow steps comprise an order collection step associated with the order, an order approval step associated with the order, and an order completion step associated with the order.

4. The method of claim 3, wherein the plurality of universal workflow steps further comprise a circuit path determination step, a circuit inventory step, a network layer provisioning step, and a circuit testing and activation step.

5. The method of claim 3, wherein the wherein the plurality of universal workflow steps further comprise a third party ordering step and a customer premises equipment configuration step.

6. The method of claim 1, further comprising directing, by the provisioning workflow management system, one or more provisioning systems distinct and separate from the provisioning workflow management system to perform at least one of the workflow tasks.

7. The method of claim 1, wherein the dynamically updating the graphical indication of the completion status of the one or more universal workflow steps comprises dynamically modifying one or more display attributes of one or more of the graphical depictions representative of the one or more universal workflow steps in response to a completion of at least one of the one or more workflow tasks associated with the universal workflow step.

8. The method of claim 1, wherein the dynamically updating the graphical indication of the completion status of the one or more universal workflow steps comprises displaying a graphical depiction of a completion status adjacent to one or more of the graphical depictions representative of the one or more universal workflow steps in response to a completion of at least one of the one or more workflow tasks associated with the one or more universal workflow steps.

9. The method of claim 1, wherein the network circuit comprises a telecommunication circuit.

10. The method of claim 1, embodied as computer-executable instructions on at least one tangible computer-readable medium.

11. A method comprising:

maintaining, by a provisioning workflow management system, data representative of one or more workflow tasks associated with each of a plurality of universal workflow steps in a provisioning workflow that is applicable to a provisioning of a plurality of distinct types of network circuits;

receiving, by the provisioning workflow management system, a request to provision a first type of network circuit included in the plurality of distinct types of network circuits;

displaying in a graphical user interface, by the provisioning workflow management system in response to the request, graphical depictions representative of the universal workflow steps as applied to the provisioning of the first type of network circuit;

detecting, by the provisioning workflow management system, a selection by a user of a graphical depiction included in the graphical depictions and representative of a universal workflow step included in the plurality of universal workflow steps;

displaying, by the provisioning workflow management system in response to the selection by the user of the graphical depiction representative of the universal workflow step, the one or more workflow tasks associated with the universal workflow step;

updating, by the provisioning workflow management system while the one or more workflow tasks associated with the universal workflow step are displayed, a completion status of at least one workflow task included in the one or more workflow tasks associated with the universal workflow step;

determining, by the provisioning workflow management system, a completion status of one or more universal workflow steps included in the plurality of universal workflow steps based on the updated completion status of the at least one workflow task; and dynamically modifying, by the provisioning workflow management system and in response to the determining of the completion status of the one or more universal workflow steps, one or more of the graphical depictions of the universal workflow steps to graphically depict the completion status of the one or more universal workflow steps in real time.

12. The method of claim 11, further comprising:
receiving, by the provisioning workflow management system, another request to provision a second type of network circuit included in the plurality of distinct types of network circuits;
displaying in another graphical user interface, by the provisioning workflow management system in response to the another request, other graphical depictions of each of the universal workflow steps as applied to the provisioning of the second type of network circuit; and
dynamically modifying, by the provisioning workflow management system, one or more of the other graphical depictions of the universal workflow steps to graphically depict progress made in completing the provisioning of the second type of network circuit.

13. The method of claim 11, wherein the network circuit corresponds to a service or product ordered by a customer by way of an order, and wherein the plurality of universal workflow steps comprise an order collection step associated with the order, an order approval step associated with the order, and an order completion step associated with the order.

14. The method of claim 13, wherein the plurality of universal workflow steps further comprise a circuit path determination step, a circuit inventory step, a network layer provisioning step, and a circuit testing and activation step.

15. The method of claim 13, wherein the plurality of universal workflow steps further comprise a third party ordering step and a customer premises equipment configuration step.

16. The method of claim 11, further comprising directing, by the provisioning workflow management system, one or more provisioning systems distinct and separate from the provisioning workflow management system to perform one or more workflow tasks associated with each of the universal workflow steps.

17. The method of claim 11, wherein graphically depicting the completion status of the one or more universal workflow steps in real time comprises dynamically modifying one or more display attributes of the one or more of the graphical depictions of the universal workflow steps.

18. The method of claim 11, embodied as computer-executable instructions on at least one tangible computer-readable medium.

19. A system comprising:
a workflow task association facility configured to associate one or more workflow tasks with each of a plurality of universal workflow steps, the one or more workflow tasks being specific to a provisioning workflow that corresponds to a first type of network circuit;
a communication facility configured to receive a request to provision a network circuit of the first type; and
a workflow management facility communicatively coupled to the communication facility and configured to
display, in response to the request, graphical depictions representative of the universal workflow steps for provisioning the network circuit of the first type in a graphical user interface,
detect a selection by a user of a graphical depiction included in the graphical depictions and representative of a universal workflow step included in the plurality of universal workflow steps;
display, in response to the selection by the user of the graphical depiction representative of the universal workflow step, the one or more workflow tasks associated with the universal workflow step;
update, while one or more workflow tasks associated with the universal workflow step are displayed, a completion status of at least one workflow task included in the one or more workflow tasks associated with the universal workflow step;
determine a completion status of one or more universal workflow steps included in the plurality of universal workflow steps based on the updated completion status of the at least one workflow task,
graphically indicate in the graphical user interface the completion status of the one or more universal workflow steps, and
dynamically update the graphical indication of the completion status of the one or more universal workflow steps in real time as the one or more workflow tasks associated with the one or more universal workflow steps are determined to be completed.

20. The system of claim 19, wherein:
the workflow task association facility is further configured to associate one or more other workflow tasks with each of the plurality of universal workflow steps, the one or more other workflow tasks being specific to another provisioning workflow that corresponds to a second type of network circuit;
the communication facility is further configured to receive another request to provision a network circuit of the second type; and
the workflow management facility is further configured to
display, in response to the request, other graphical depictions of the universal workflow steps in the graphical user interface,
determine a completion status of each of the universal workflow steps associated with the other graphical depictions based on a completion status of each of the one or more other workflow tasks associated with each of the universal workflow steps, and
graphically indicate in the graphical user interface the completion status of each of the universal workflow steps associated with the other graphical depictions.

* * * * *